United States Patent [19]

Horvath et al.

[11] Patent Number: 5,101,562
[45] Date of Patent: Apr. 7, 1992

[54] SQUEEZER CUTTER

[76] Inventors: Edward Horvath, 1737 Libby Pl.; Frank Quarto, 1738 Hutchinson River Pkwy., both of Bronx, N.Y. 10461; George Spector, 233 Broadway Room 3815, New York, N.Y. 10007

[21] Appl. No.: 709,346
[22] Filed: Jun. 3, 1991
[51] Int. Cl.$^5$ ............................................. B26B 11/00
[52] U.S. Cl. ............................................. 30/2; 7/156; 30/123; 222/80; 222/106
[58] Field of Search ............... 30/1.5, 2, 123, 134–135, 30/186, 289, 294; 7/151, 156; 222/80, 82, 103, 102, 106

[56] References Cited

U.S. PATENT DOCUMENTS 4,570,339  2/1986  Taylor ............................. 30/123 X Primary Examiner—Douglas D. Watts

[57] ABSTRACT

A cutting squeezer tool is provided for a condiment foil pouch which consists of an elongated flat handle so that a person using the tool can grip the handle and a mechanism on the end of the handle for cutting the edge of the condiment foil pouch and for squeezing the contents out of the condiment foil pouch.

3 Claims, 1 Drawing Sheet

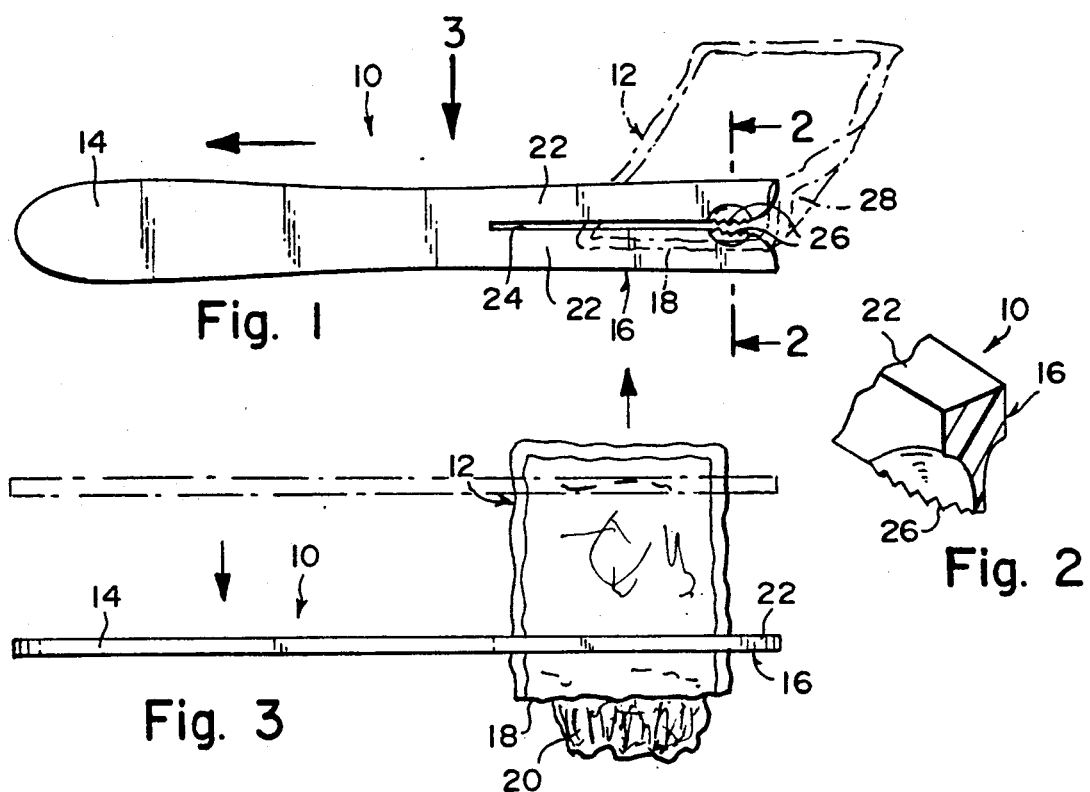
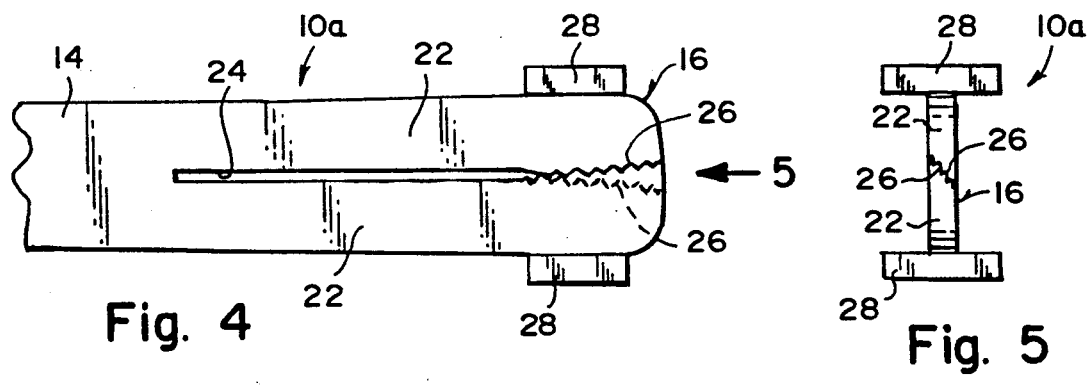

SQUEEZER CUTTER

BACKGROUND OF THE INVENTION

The instant invention relates generally to hand-held implements and more specifically it relates to a cutting squeezer tool for a condiment foil pouch, which provides a pair of blades for cutting the end of the foil pouch and then squeezing the contents therefrom.

There are available various conventional hand-held implements which do not provide the novel improvements of the invention herein disclosed.

SUMMARY OF THE INVENTION

A primary object of the present invention is to provide a cutting squeezer tool for a condiment foil pouch that will overcome the shortcomings of the prior art devices.

Another object is to provide a cutting squeezer tool for a condiment foil pouch that has a pair of blades with serrated tips for cutting the edge of the condiment foil pouch off and then be able to squeeze the contents out of the condiment foil pouch.

An additional object is to provide a cutting squeezer tool for a condiment foil pouch in which the blades overlap at the serrated tips and have finger grips to better help cut the end off the condiment foil pouch.

A further object is to provide a cutting squeezer tool for a condiment foil pouch that is simple and easy to use.

A still further object is to provide a cutting squeezer tool for a condiment foil pouch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the instant invention cutting the edge of a condiment foil pouch.

FIG. 2 is a cross sectional perspective view of one blade taken along line 2—2 in FIG. 1, showing the serrated tip in greater detail.

FIG. 3 is a top view taken in direction of arrow 3 in FIG. 1, showing the instant invention removing the contents from the cut condiment foil pouch.

FIG. 4 is an enlarged side view with parts broken away of a modification in which the blades overlap at the serrated tips thereof.

FIG. 5 is an end view taken in direction of arrow 5 in FIG. 4, showing the finger grips on the blades in greater detail.

DETAILED DESCRIPTION OF THE PREFERRED EMBODIMENTS

Turning now descriptively to the drawings, in which similar reference characters denote similar elements throughout the several views, the Figures illustrate a cutting squeezer tool 10 for a condiment foil pouch 12, which consists of an elongated flat handle 14 so that a person using the tool can grip the handle 14 and a mechanism 16 on the end of the handle 14 for cutting the edge 18 of the condiment foil pouch 12 and for squeezing the contents 20 out of the condiment foil pouch 12.

The cutting and squeezing mechanism includes a pair of parallel flat flexible blades 22 extending from the end of the handle 14 having a narrow elongated slot 24 formed between the blades 22. Each blade 22 has a serrated cutting tip 26 so that when the edge 18 of the foil pouch 12 is to be cut it is inserted in the slot 24. The blades 22 are squeezed together, the corner 28 of the foil pouch 12 is bent and gripped while the tool 10 is pulled across and away from the foil pouch 12 allowing the serrated cutting tips 26 to cut the edge 18 of the foil pouch 12. When the foil pouch 12 is to be squeezed it is inserted in the slot 24 opposite from the cut edge 18 and pulled so that the condiments contents 20 will exit from the cut edge 18.

A modified cutting squeezer tool 10a is shown in FIGS. 4 and 5, wherein the serrated cutting tips 26 of said blades 22 overlap so as to better cut into the edge 18 of the foil pouch 12 when the tool 10a is pulled across and away from the foil pouch 12. The cutting squeezer tool 10a further includes a pair of finger grips 28. Each finger grip 28 is formed on one blade 22 opposite from its respective serrated cutting tip 26 to better help squeeze the blades 22 together when the serrated cutting tips 26 cut into the edge 18 of the foil pouch 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cutting squeezer tool for a condiment foil pouch which comprises:
   (a) an elongated flat handle so that a person using said tool can grip said handle; and
   (b) means on the end of said handle for cutting the edge of the condiment foil pouch and for squeezing the contents out of the condiment foil pouch; wherein said cutting and squeezing means includes a pair of parallel flat flexible blades extending from the end of said handle having a narrow elongated slot formed between said blades, each said blade having a serrated cutting tip so that when the edge of the foil pouch is to be cut it is inserted in the slot, said blades are squeezed together, the corner of the foil pouch is bent and gripped while said tool is pulled across and away from the foil pouch allowing the serrated cutting tips to cut the edge of the foil pouch, when the foil pouch is to be squeezed it is inserted in the slot opposite from the cut edge and pulled so that the condiment contents will exit from the cut edge.

2. A cutting squeezer tool as recited in claim 1, wherein the serrated cutting tips of said blades overlap so as to better cut into the edge of the foil pouch when the tool is pulled across and away from the foil pouch.

3. A cutting squeezer tool as recited in claim 2, further including a pair of finger grips, each said finger grip formed on one said blade opposite from its respective serrated cutting tip to better help squeeze said blades together when the serrated cutting tips cut into the edge of the foil pouch.

* * * * *